United States Patent
Aihara (12) 
(10) Patent No.: US 6,553,026 B1
(45) Date of Patent: Apr. 22, 2003

(54) COMMUNICATION PATH SWITCHING APPARATUS, COMMUNICATION PATH SWITCHING METHOD, AND COMPUTER PROGRAM PRODUCT FOR CONTROLLING COMMUNICATION PATH SWITCHING SYSTEM

(75) Inventor: Makoto Aihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/345,671

(22) Filed: Jun. 30, 1999

(30) Foreign Application Priority Data

Jul. 9, 1998 (JP) ............................. 10-208516

(51) Int. Cl.[7] ..................... H04Q 11/00; H04L 12/50
(52) U.S. Cl. ................. 370/358; 370/366; 370/376
(58) Field of Search ....................... 370/358, 366, 370/372, 375, 376, 391

(56) References Cited

U.S. PATENT DOCUMENTS 4,679,191 A * 7/1987 Nelson et al. ............ 370/84
5,799,014 A * 8/1998 Kozaki et al. ........... 370/358

FOREIGN PATENT DOCUMENTS

| JP | 60-46192 | 3/1985 |
|----|----------|--------|
| JP | 62-130098 | 6/1987 |
| JP | 4-180499 | 6/1992 |
| JP | 6-6879 | 1/1994 |
| JP | 6-125328 | 5/1994 |
| JP | 7-15777 | 1/1995 |
| JP | 9-238118 | 9/1997 |

\* cited by examiner

*Primary Examiner*—Chau Nguyen
*Assistant Examiner*—Scott Waite
(74) *Attorney, Agent, or Firm*—Dickstein, Shapiro, Morin & Oshinsky, LLP (57) ABSTRACT

The present invention increases the communication path switching control speed.

A demultiplexing circuit 2a is provided at an input side of a time division switch 1 and converts a serial signal of an input high 20a of multiplexed 32 Kbps sub rate channels into serial signals of the input highway 21a and 22a of multiplexed 64 Kbps full rate channels. A multiplexing circuit 2b is provided at an output side of the time division switch and converts serial signals of the output highways 21b and 22b of multiplexed 64 Kbps full rate channels into a serial signal of the output highway 20b of multiplexed 32 Kbps sub rate channels.

9 Claims, 6 Drawing Sheets

COMMUNICATION PATH SWITCHING APPARATUS, COMMUNICATION PATH SWITCHING METHOD, AND COMPUTER PROGRAM PRODUCT FOR CONTROLLING COMMUNICATION PATH SWITCHING SYSTEM

BACKGROUND OF THE INVENTION

1. Field of the Invention

The present invention relates to a communication path switching apparatus, a communication path switching method, and computer program product for controlling communication path switching system. In particular, the present invention relates to a communication path switching apparatus and a communication path switching method which can preferably be used for a sub rate switch of a line exchanger containing an ISDN basic interface (2B+D) or a line exchanger for multiplexing a compressed voice signal with a low-speed data as well as to a recording medium.

2. Description of the Related Art

For example, Japanese Patent Publication (Unexamined) A4-180499 discloses a "time switch" including a highway selector in the output highway of the time division switch so as to simultaneously read out an information memory, feed a control signal to the selector, and select one-bit information within a time slot, thus realizing the sub rate switch.

Figure 6:
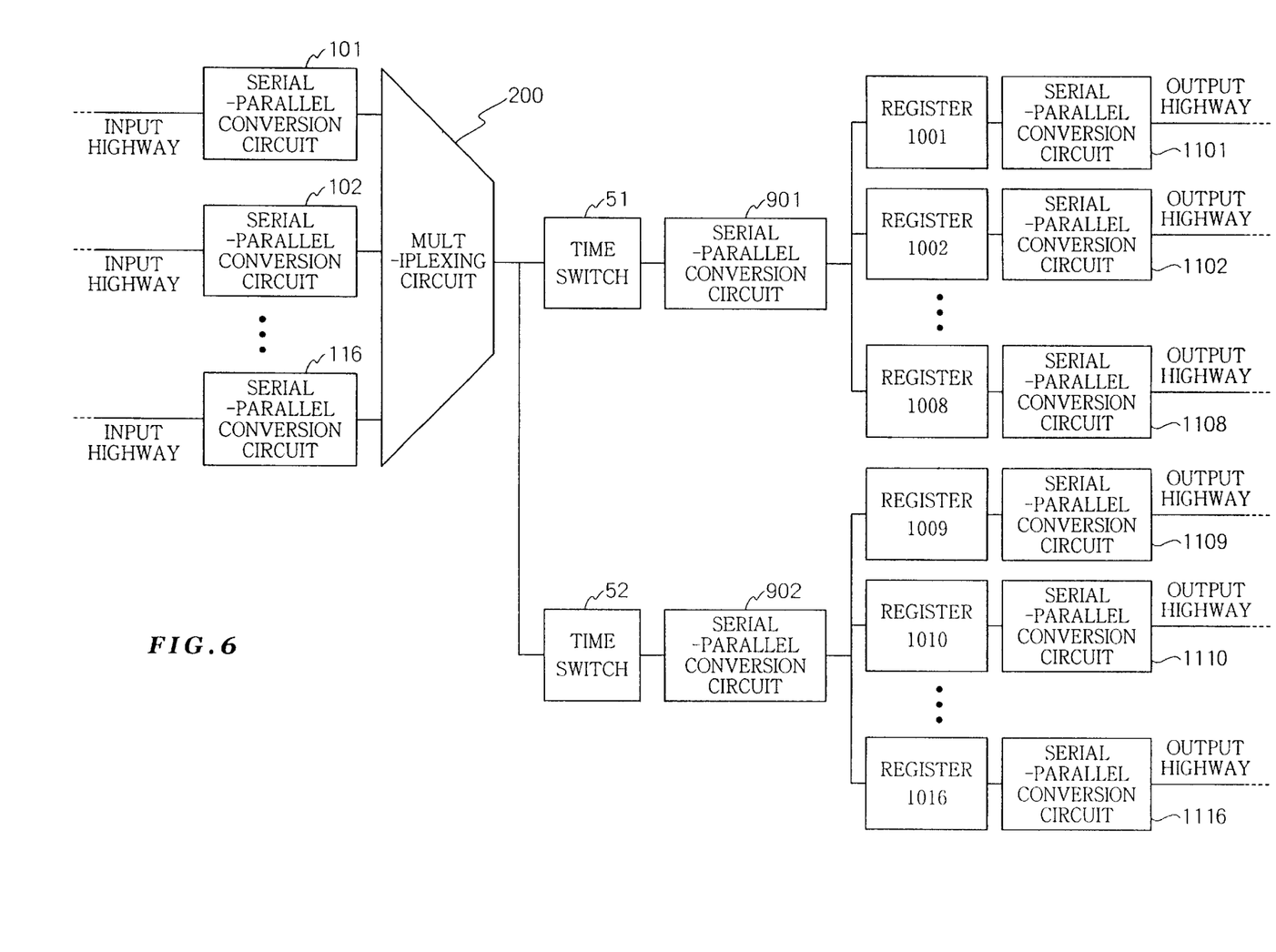
FIG. 6 is a block diagram showing a configuration example of a conventional communication path switching apparatus.

FIG. 6 is a block diagram showing a configuration example for implementing the method disclosed in the aforementioned prior art document. As shown in FIG. 6, in the prior art method, no de-multiplexing circuit and no multiplexing circuit are provided for replacing a sub rate channel and a full rate channel with each other at the input and the output of the time division switch.

Accordingly, when switching a 64-Kbps full rate channel, it is necessary to switch eight channels of the 8 kilo bit/second (Kbps). Moreover, even when switching 16-Kbps sub rate channel, it is necessary to switch the 8 Kbps sub rate channel for two channels.

This processing amount of the communication path switching control is increased, thus lowering the processing capacity of the control apparatus.

Moreover, depending on the speed of the channel to be contained, the time division switch size is changed. This makes it difficult to calculate the time division switch size required for the line exchanger. This result in deterioration of the call loss due to insufficient facility or cost increase due to an excessive facility.

SUMMARY OF THE INVENTION

It is therefore an object of the present invention to enable, in a line exchanger containing a highway of 64 Kbps full rate channels multiplexed and a highway of 16-Kbps and 32-Kbps sub rate channel multiplexed, to increase the communication path switching control speed so as to easily and accurately calculate the time division switch size.

The present invention provides a communication path switching apparatus comprising: a highway multiplexing full rate channels of a first transfer rate; a highway multiplexing sub rate channels of a second transfer rate lower than the first transfer rate multiplexed; a time division switch for performing switching control; a first conversion circuit, provided at an input of the time division switch, for replacing the sub channel of the second transfer rate with the full rate channel of the first transfer rate; and a second conversion circuit, provided at an output of the time division switch, for replacing the full channel of the first transfer rate with the sub rate channel of the second transfer rate.

Moreover, the time division switch can perform switching control always on the full rate channel basis of the first transfer rate.

Moreover, the first conversion circuit can successively convert a serial data of the highway of the sub rate channels multiplexed, into parallel data of a predetermined number of bits; add an invalid data to each of the divided parallel data of the predetermined number of bits, so as to obtain parallel data of the predetermined number of bits, thus converting the data into a serial data of the highway of full rate channels of the first transfer rate multiplexed.

Moreover, the second conversion circuit can successively convert a plurality of serial data of the highway of the full rate channels multiplexed, into parallel data of a predetermined number of bits; remove an invalid data from each of the parallel data and connect valid data of the parallel data, thus converting the data into a serial data of the highway of sub rate channels of the second transfer rate multiplexed.

Moreover, the first transfer rate may be 64 K bits per second.

Moreover, the second transfer rate may be at least one of 32 Kbps, 16 Kbps, and 8 Kbps.

According to another aspect of the present invention, there is provided a communication path switching method in a communication path switching apparatus comprising: a highway multiplexing full rate channels of a first transfer rate; a highway multiplexing sub rate channels of a second transfer rate lower than the first transfer rate; and time division switch for performing switching control; said method including: a step of replacing the sub channel of the second transfer rate with the full rate channel of the first transfer rate at an input side of the time division switch; and a step of replacing the full channel of the first transfer rate with the sub rate channel of the second transfer rate at an output side of the time division switch.

According to still another aspect of the present invention, there is provided a computer program product for controlling the aforementioned communication path switching system.

In the communication path switching apparatus, the communication switching method, and computer program product for controlling communication path switching system according to the present invention, a sub channel is replaced by a full rate channel at the input side of the time division switch, and full rate channel is replaced by a sub rate channel at the output side of the time division switch.

DESCRIPTION OF THE PREFERRED EMBODIMENTS

Figure 1:
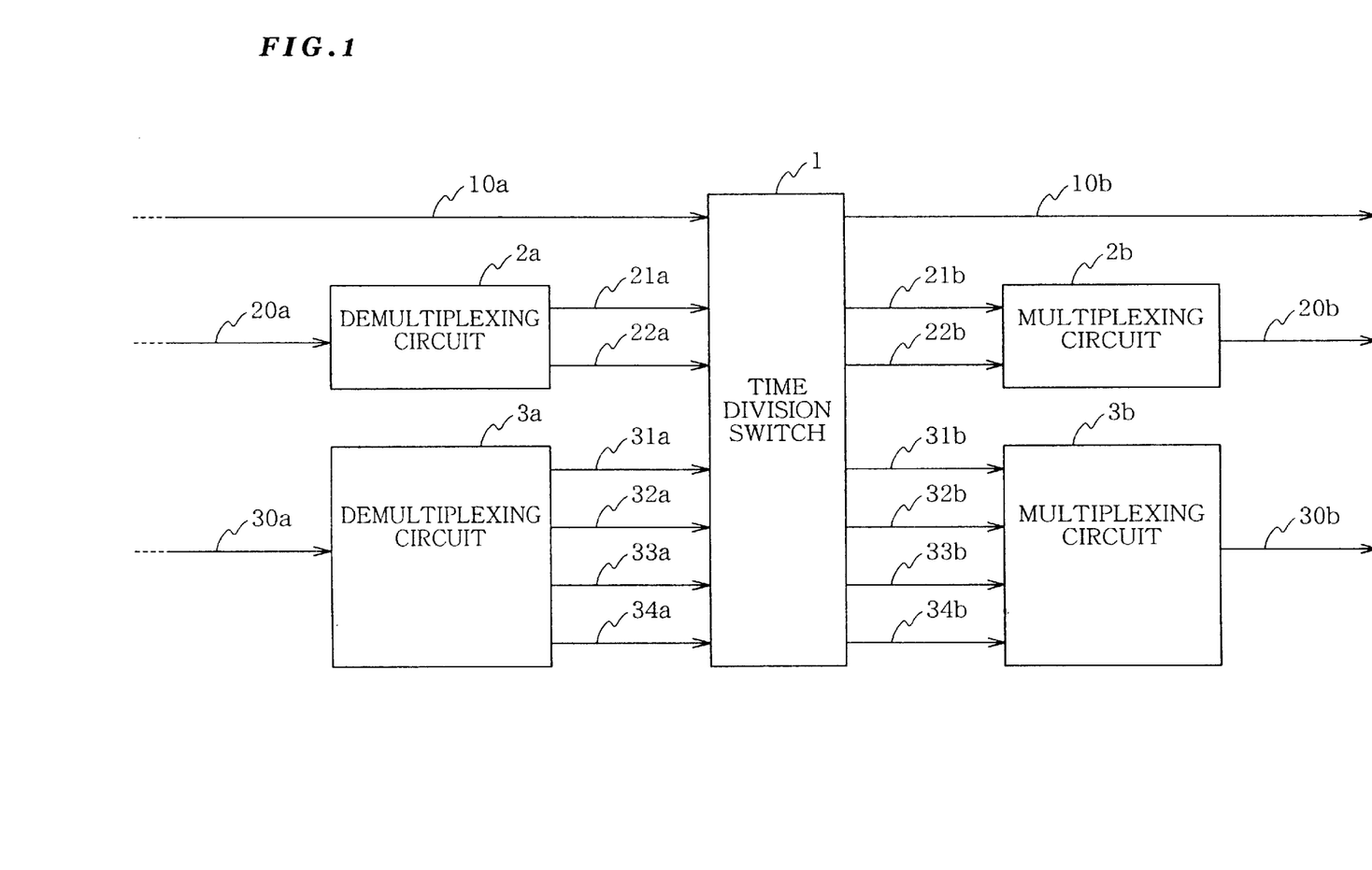
FIG. 1 is a block diagram showing a configuration example of a line exchanger using a communication path switching apparatus according to the present invention.

FIG. 1 is a block diagram showing a configuration example of a line exchanger using a communication path switching apparatus according to the present invention. As shown in the figure, the line exchanger includes: a time division switch 1 for switching on 64 kbit/second (Kbps) full rate channel basis; demultiplexing circuits 2a and 3a provided at the inputs of the time division switch 1; and multiplexing circuits 2b and 3b provided at the outputs of the time division switch 1.

The time division switch 1 performs switching between input highways 10a, 21a, 22a, 31a, 32a, 33a, and 34a and output highways 10b, 21b, 22b, 31b, 32b, 33b, and 34b where 64-Kbps full rate channels are multiplexed.

The demultiplexing circuit 2a converts the input highway 20a of 32-Kbps sub rate channel multiplexing into input highways 21a and 22a of 64-Kbps full rate channel multiplexed.

The demultiplexing circuit 3a converts the input highway 30a of multiplexed 16-Kbps sub rate channel into input highways 31a, 32a, 33a, and 34a of multiplexed 64-Kbps full rate channels.

The multiplexing circuit 2b converts the output highways 21b and 22b of multiplexed 64-Kbps full rate channels into the output highway 20b of multiplexed 32-Kbps sub rate channels.

The multiplexing circuit 3b converts the output highways 31b, 32b, 33b, and 34b of multiplexed 64-Kbps full rate channels into the output highway 30b of multiplexed 16-Kbps sub rate channels.

Figure 2:
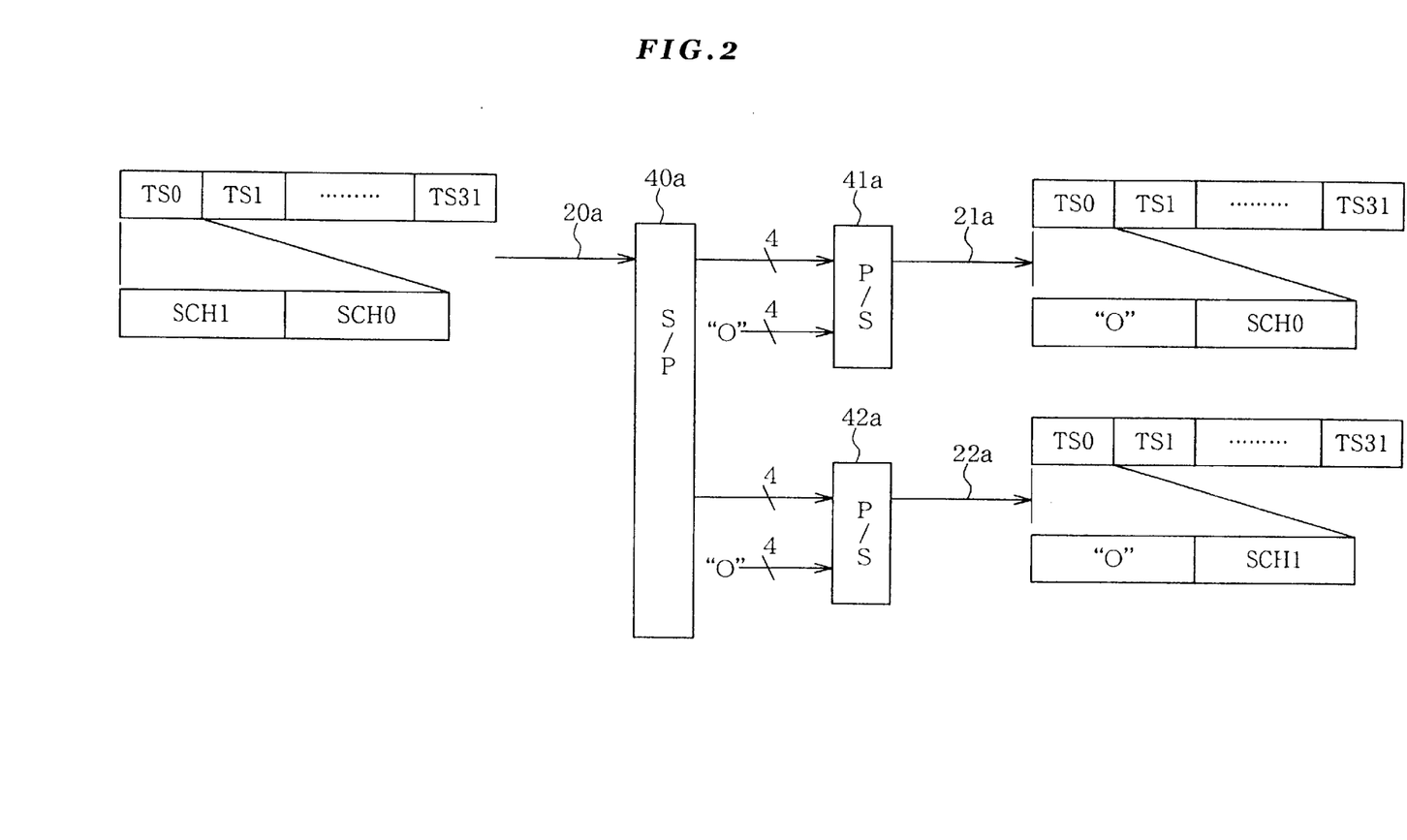
FIG. 2 is a block diagram showing a configuration example of a demultiplexing circuit 2a of FIG. 1.

FIG. 2 is a block diagram showing a configuration example of the demultiplexing circuit 2a shown in FIG. 1. As shown in FIG. 2, the demultiplexing circuit 2a is constituted by a serial-parallel conversion circuit 40a and parallel-serial conversion circuits 41a and 42a.

Figure 3:
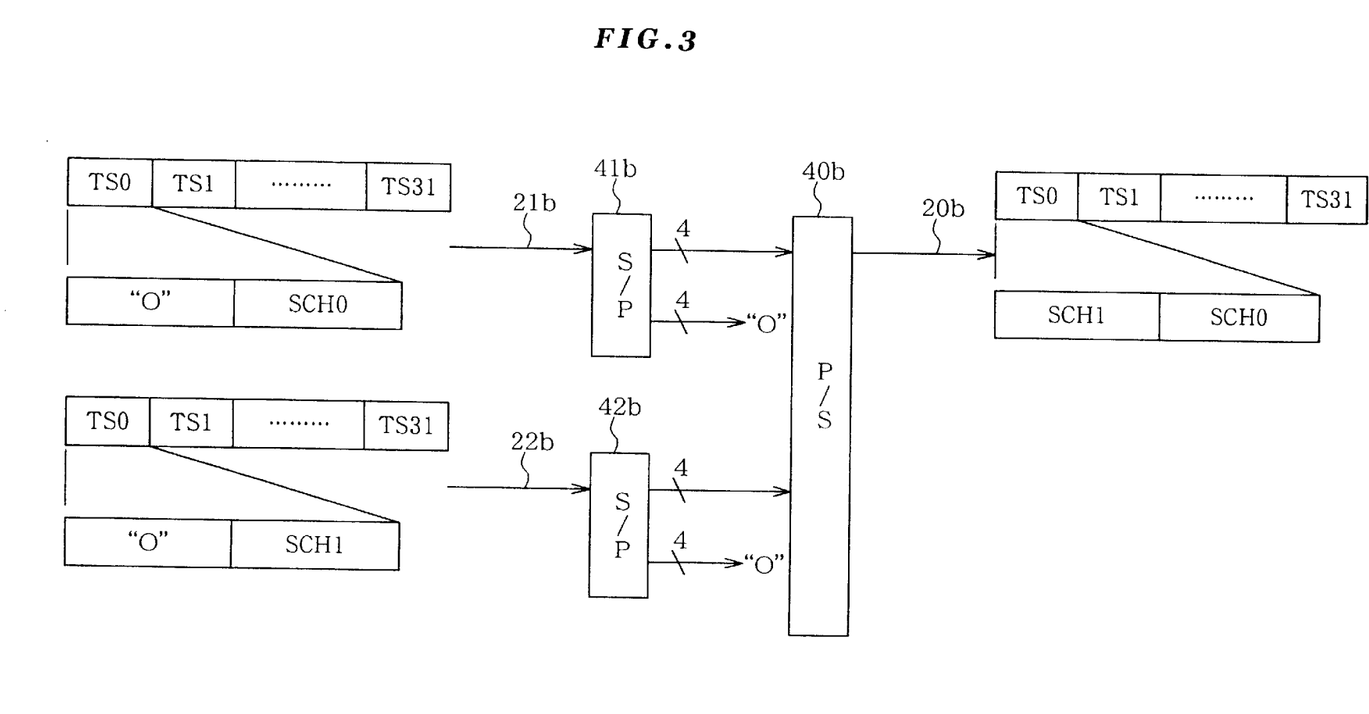
FIG. 3 is a block diagram showing a configuration example of a multiplexing circuit 2b of FIG. 1.

FIG. 3 is a block diagram showing a configuration example of the multiplexing circuit 2b shown in FIG. 1. As shown in FIG. 3, the multiplexing circuit 2b is constituted by serial-parallel conversion circuits 41b and 42b and a parallel-serial conversion circuit 40b.

Next, referring to FIG. 2 and FIG. 3, explanation will be given on the conversion between the highway of the 32-Kbps sub rate channels (SCH0, SCH1) multiplexed and the highway of the 64-Kbps full rate channels multiplexed.

As shown in FIG. 2, a serial signal of the input highway 20a of the 32-Kbps sub rate channels (SCH0, SCH1) multiplexed is converted by the serial-parallel conversion circuit 40a into 8-bit parallel signals. After this, the least significant 4-bit output and the most significant 4-bit output respectively serve as a least significant 4-bit input to the parallel-serial conversion circuits 41a and 42a, while the most significant 4-bit input to the parallel-serial conversion circuits 41a and 42a are fixed to 0 ("0000" in binary expression), thus converting into serial signals of the input highways 21a and 22a of the 64-Kbps full rate channels multiplexed.

The serial signals of the input highways 21a and 22a are respectively output by the time division switch 1 to the output highways 21b and 22b.

Next, as shown in FIG. 3, the serial signal of the output highway 21b of the multiplexed 64-Kbps full rate channel is converted by the serial-parallel conversion circuit 41b into 8-bit parallel signals. Similarly, the serial signal of the output highway 22b of the multiplexed 64-Kbps full rate channel is converted by the serial-parallel conversion circuit 42b into 8-bit parallel signals.

After this, the least significant 4-bit output of the 8-bit parallel signal from the serial-parallel conversion circuit 41b is fed as the least significant 410 bit input of the parallel-serial conversion circuit 40b, and the least significant 4-bit output of the 8-bit parallel signal from the serial-parallel conversion circuit 42b is fed as the most significant 4-bit input of the parallel-serial conversion circuit 40b, discarding the most significant 4-bit output (0000 in binary expression).

These inputs are converted by the parallel-serial conversion circuit 40b into a serial signal of the output highway 20b multiplexing 32 Kbps sub rate channels (SCH0, SCH1).

Figure 4:
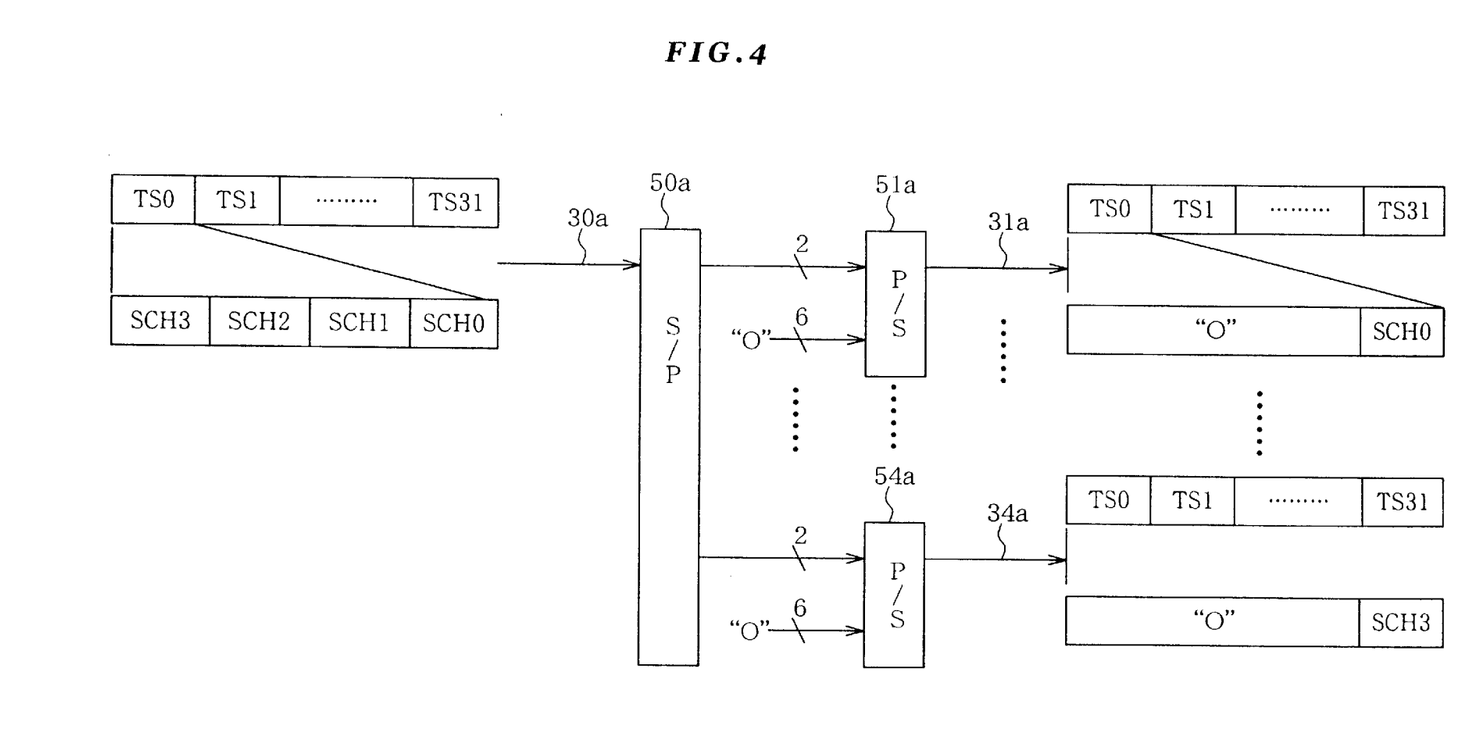
FIG. 4 is a block diagram showing a configuration example of a demultiplexing circuit 3a of FIG. 1.

FIG. 4 is a block diagram showing a configuration example of the demultiplexing circuit 3a shown in FIG. 1. As shown in this figure, the demultiplexing circuit 3a is constituted by a serial-parallel conversion circuit 50a and parallel-serial conversion circuits 51a to 54a.

Figure 5:
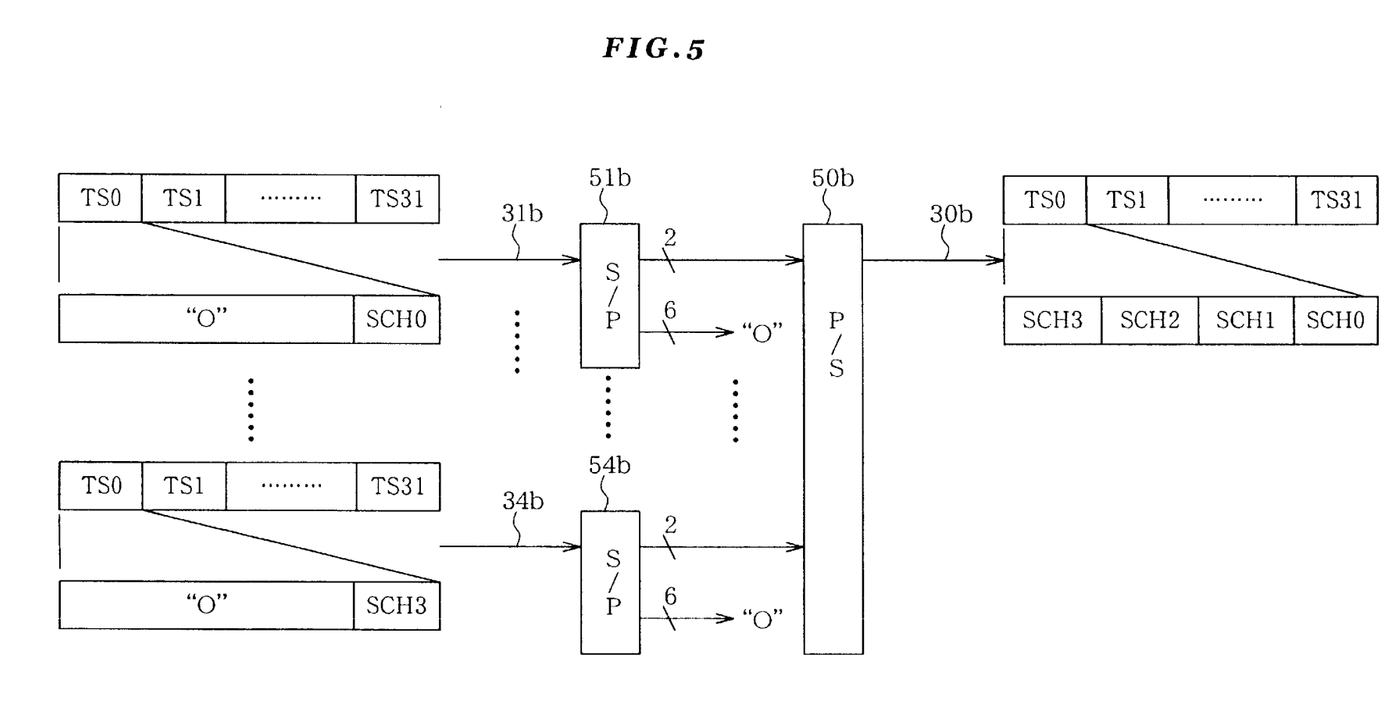
FIG. 5 is a block diagram showing a configuration example of a multiplexing circuit 3b of FIG. 1.

FIG. 5 is a block diagram showing a configuration example of the multiplexing circuit 3b shown in FIG. 1. As shown in this figure, the multiplexing circuit 3b is constituted by serial-parallel conversion circuits 51b to 54b and a parallel-serial conversion circuits 50b.

Hereinafter, referring to FIG. 4 and FIG. 5, explanation will be given on conversion between the highway where the 16 Kbps sub rate channels (SCH0, SCH1, SCH2, SCH3) are multiplexed and the highway where the 64 Kbps full rate channels are multiplexed.

As shown in FIG. 4, a serial signal of the input highway 30a multiplexing the 16-Kbps sub rate channels (SCH0, SCH1, SCH2, SCH3) is converted into an 8-bit parallel signal by the serial-parallel conversion circuit 50a. After this, the least significant two bits of the 8-bit parallel signal from the serial-parallel conversion circuit 50a are fed as the least significant two bits to the parallel-serial conversion circuit 51a. Similarly, the next least significant two bits of the 8-bit parallel signal from the serial-parallel conversion circuit 50a are fed as the least significant two bits to the parallel-serial conversion circuit 52a. Similarly, the further least significant two bits of the 8-bit parallel signal from the serial-parallel conversion circuit 50a are fed as the least significant two bits to the parallel-serial conversion circuit 53a. Similarly, still further next least significant two bits of the 8-bit parallel signal from the serial-parallel conversion circuit 50a are fed as the least significant two bits to the parallel-serial conversion circuit 54a. The most significant six bits of the parallel-serial conversion circuits 51a, 52a, 53a, and 54a are fixed to "0" ("000000" in binary expression).

Thus, the serial signal of the input highway 30a multiplexing 16-Kbps sub rate channels (SCH0, SCH1, SCH2, SCH3) is converted into the serial signals of the respective input highways 31a, 32a, 33a, 34a multiplexing the 64-Kbps full rate channels.

The serial signals of the input highways 31a, 32a, 33a, and 34a are respectively output via the time division switch 1 to the output highways 31b, 32b, 33b, and 34b.

Next, as shown in FIG. 5, the serial signal of the output highway 31b multiplexing 64-Kbps full rate channels is converted by the serial-parallel conversion circuit 51b into an 8-bit parallel signal. Similarly, serial signals of the output highways 32b, 33b, and 34b multiplexing 64-Kbps full rate channels are respectively converted into 8-bit parallel signals by the serial-parallel conversion circuit 52b, 53b, and 54b.

The least significant 2-bit outputs of the 8-bit parallel signals are successively connected to the input of the parallel-serial conversion circuit 50*b*, discarding the most significant 6-bit outputs ("000000" in binary expression). Thus, the 8-bit parallel signal is converted into a serial signal of the output highway 30*b* multiplexing the 16-Kbps sub rate channels (SCH0, SCH1, SCH2, and SCH3). In this way, the serial signal of the output highway 31*b* multiplexing 64-Kbps full rate channels is converted into a serial signal of the output highway 30*b* multiplexing 16-Kbps sub rate channels.

As has been described above, by performing, at the input and output of the time division switch 1, conversion between the highway multiplexing 16-Kbps and 32-Kbps sub rate channels and the highway multiplexing 64-Kbps full rate channels, the time division switch 1 can realize a sub rate switch for controlling switching always on the 64-Kbps full rate channel basis.

Accordingly, even if the line exchanger includes a highway for multiplexing 64-Kbps full rate channels and a highway for multiplexing 16-Kbps and 32-Kbps sub rate channels, the time division switch can realize a sub rate switch for always switching on the 64-Kbps full rate channel basis. This increases the communication path switching control speed.

Furthermore, the time division switch size can be calculated easily and accurately from the total of the full rate channels and the sub rate channels. This can suppress deterioration of the call loss rate due to insufficient facility or cost increase due to excessive facility.

It should be noted that in the aforementioned embodiment, the present invention is applied to 32-Kbps and 16-Kbps sub rater channels. However, the present invention can also be applied to an 8-Kbps sub rate channels or other sub rate channel.

Moreover, in the aforementioned embodiment, explanation has been given on the 64-Kbps full rate channel, but the present invention is not to be limited to this.

As has been described above, in the communication path switching apparatus, the communication path switching method, and the computer program product for controlling communication Path Switching system according to the present invention, a sub rate channel is replaced by a full rate channel at the input side of the time division switch and a full rate channel is replaced by a sub rate channel at the output side of the time division switch. Consequently, the time division switch can perform switching always on the full rate channel basis, enabling to increase the communication path switching control as well as to calculate the time division switch size easily and accurately.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-208516 (Filed on Jul. 9, 1998) including specification, claims, drawings and summary are incorporated herein by reference in its entirety.

What is claimed is:

1. A communication path switching apparatus comprising:
   a highway carrying multiplexed fill rate channels of a first transfer rate;
   a highway carrying multiplexed sub rate channels of a second transfer rate lower than the first transfer rate;
   a time division switch for performing switching control;
   a first conversion circuit, provided at an input of the time division switch, for replacing the sub rate channel of the second transfer rate with the full rate channel of the first transfer rate, said first conversion circuit including a serial to parallel converter and a parallel to serial converter; and
   a second conversion circuit, provided at an output of the time division switch, for replacing the full rate channel of the first transfer rate with the sub rate channel of the second transfer rate said second conversion circuit including a serial to parallel converter and a parallel to serial converter.

2. A communication path switching apparatus as claimed in claim 1, wherein the time division switch performs switching control always on the full rate channel basis of the first transfer rate.

3. A communication path switching apparatus as claimed in claim 1, wherein the first conversion circuit successively converts a serial data of the highway of the sub rate channels multiplexed, into parallel data of a predetermined number of bits; adds an invalid data to each of the divided parallel data of the predetermined number of bits, so as to obtain parallel data of the predetermined number of bits, thus converting the data into a serial data of the highway of full rate channels of the first transfer rate multiplexed.

4. A communication path switching apparatus as claimed in claim 1, wherein the second conversion circuit successively converts a plurality of serial data of the highway of the full rate channels multiplexed, into parallel data of a predetermined number of bits; removes an invalid data from each of the parallel data and connects valid data of the parallel data, thus converting the data into a serial data of the highway of sub rate channels of the second transfer rate multiplexed.

5. A communication path switching apparatus as claimed in claim 1, wherein the first transfer rate is 64 K bits per second.

6. A communication path switching apparatus as claimed in claim 1, wherein the second transfer rate is at least one of 32 Kbps, 16 Kbps, and 8 Kbps.

7. A communication path switching apparatus comprising:
   a highway carrying multiplexed full rate channels of a first transfer rate;
   a highway carrying multiplexed sub rate channels of a second transfer rate lower than the first transfer rate;
   a time division switch for performing switching control;
   first conversion means, provided at an input of the time division switch, for replacing the sub channel of the second transfer rate with the full rate channel of the first transfer rate, said first conversion circuit including a serial to parallel converter and a parallel to serial converter; and
   second conversion means, provided at an output of the time division switch, for replacing the full rate channel of the first transfer rate with the sub rate channel of the second transfer rate, said second conversion circuit including a serial to parallel converter and a parallel to serial converter.

8. A communication path switching method in a communication path switching apparatus comprising: a highway carrying multiplexed full rate channels of a first transfer rate; a highway carrying multiplexed sub rate channels of a second transfer rate lower than the first transfer rate; a time division switch for performing switching control; said method including:

replacing the sub rate channel of the second transfer rate with the full rate channel of the first transfer rate at an input side of the time division switch, wherein serial data of the sub rate channel is converted into parallel data of a predetermined number of bits by adding invalid data to each of the divided parallel data of the predetermined number of bits, so as to obtain parallel data of the predetermined number of bits; and replacing the full rate channel of the first transfer rate with the sub rate channel of the second transfer rate at an output side of the time division switch, wherein serial data of the full rate channel is converted into parallel data of a predetermined number of bits by removing the invalid data from each of the divided parallel data of the predetermined number of bits, so as to obtain parallel data of the predetermined number of bits.

9. A computer program product stored on a storage medium for a controlling communication path switching system, the system comprising: a highway carrying multiplexed full rate channels of a first transfer rate; a highway carrying multiplexed sub rate channels of a second transfer rate lower than the first transfer rate; and a time division switch for performing switching control; the program causing the system to:

replace the sub rate channel of the second transfer rate with the full rate channel of the first transfer rate at an input side of the time division switch, wherein serial data of the sub rate channel is converted into parallel data of a predetermined number of bits by adding invalid data to each of the divided parallel data of the predetermined number of bits, so as to obtain parallel data of the predetermined number of bits; and replace the full rate channel of the first transfer rate with the sub rate channel of the second transfer rate at an output side of the time division switch, wherein serial data of the full rate channel is converted into parallel data of a predetermined number of bits by removing the invalid data from each of the divided parallel data of the predetermined number of bits, so as to obtain parallel data of the predetermined number of bits.

* * * * *